3,772,201
ELECTRODE FOR ELECTROLYTIC CONVERSION CELLS INCLUDING PASSAGE MEANS IN THE ELECTRODE FOR ELECTROLYTE FLOW THROUGH THE ELECTRODE
King L. Mills, Bartlesville, Okla., assignor to Phillips Petroleum Company
Original application Mar. 2, 1970, Ser. No. 15,389, now Patent No. 3,663,380. Divided and this application Dec. 27, 1971, Ser. No. 211,895
Int. Cl. B01k 3/04, 3/08
U.S. Cl. 204—277        13 Claims

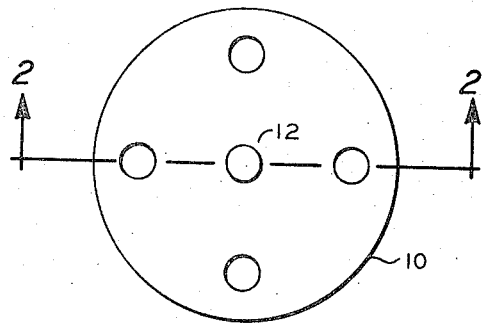
FIG. 1
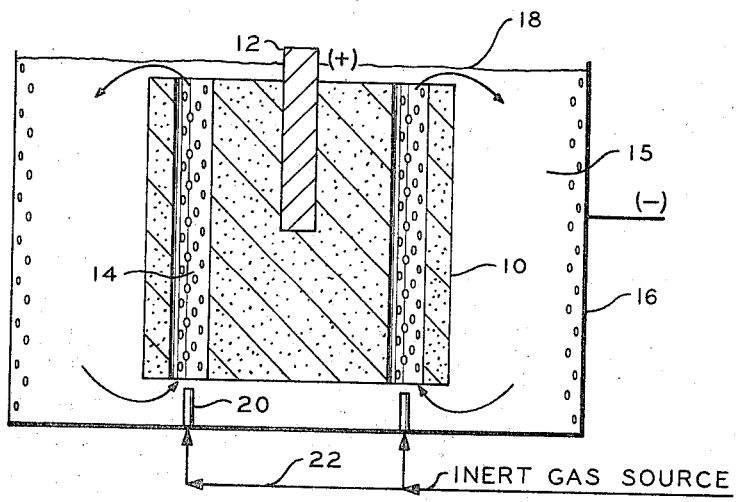
FIG. 2
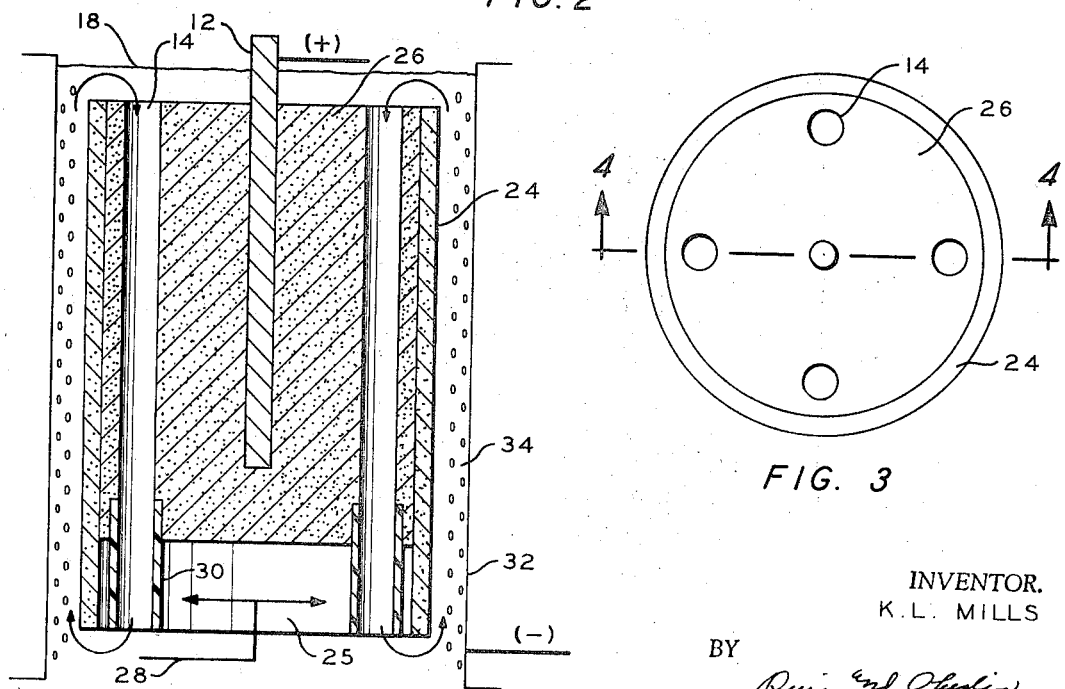
FIG. 4
FIG. 3
INVENTOR.
K.L. MILLS
BY
ATTORNEYS United States Patent Office
3,772,201
Patented Nov. 13, 1973

ABSTRACT OF THE DISCLOSURE

An electrode employed in an electrolytic cell is provided with at least one passageway extending therethrough, preferably in a generally vertical direction. Electrolyte circulates through said passageway and cools said electrode. If desired, circulation of said electrolyte can be enhanced by introducing an inert gas into said passageway.

---

This application is a division of my copending application Ser. No. 15,389, filed Mar. 2, 1970, now Pat. No. 3,663,380, issued May 16, 1972.

This invention relates to electrodes employed in electrolytic conversion processes.

Generally speaking, the utilization of an electrode in an electrochemical conversion process involves immersing the electrode in an electrolyte and passing an electric current from one electrode element through said electrolyte to an oppositely charged electrode element. The electrochemical conversion, particularly when practiced on a commercial scale, is accompanied by the generation of considerable heat. Provision can be made for dissipation of said heat by providing means for cooling the electrolyte, either externally or internally of the cell.

However, the heat generated in the electrochemical conversion process is usually concentrated at one of the electrodes. This usually means that the electrode temperature is higher than the electrolyte temperature, particularly the temperature of the internal portion of the electrode. This has a number of disadvantages and creates problems in operation of the cell and the process. For example, excessive heating can cause the electrode to be subject to intense hot spots which shorten the life of the electrode. When the surface(s) of the electrode is the point(s) at which a chemical reaction is occurring, the selectivity and efficiency of the reaction can be adversely affected. This can be particularly true when the reaction is occurring within the confines of the electrode, e.g., within the pores of a porous electrode. When the electrode is being employed as an anode, the increased temperature thereof can contribute to the occurrence of "anode effect."

The present invention provides a solution to the above problems. I have now discovered that the temperature of an electrode in an electrochemical conversion process can be maintained, and/or controlled, at desirable levels by providing said electrode with at least one passageway which extends therethrough, preferably in a generally vertical direction. Circulation of electrolyte through said passageway will then provide temperature control for the electrode, particularly the internal portion thereof, with the result that the temperature of the electrode can be maintained more nearly uniform throughout its structure. I have also discovered that, if desired, the circulation of the electrolyte through said passageway can be enhanced by introducing an inert gas into said passageway.

An object of this invention is to provide an improved electrode structure. Another object of this invention is to provide an improved electrode structure which is provided with internal cooling means. Another object of this invention is to provide an improved electrochemical conversion apparatus. Another object of this invention is to provide an improved electrochemical conversion apparatus wherein means are provided for introducing an inert gas into a temperature adjusting passageway which extends through an electrode employed in an electrolytic cell. Another object of this invention is to provide an electrochemical conversion process wherein the temperature of the electrode(s) employed therein can be maintained at substantially the same temperature as the surrounding electrolyte. Other aspects, objects, and advantages of the invention will be apparent to those skilled in the art in view of this disclosure.

Thus, according to the invention, there is provided an electrode structure comprising: an electrode element; an electrically conductive current collector mounted in said electrode element; and at least one passageway extending through said electrode element in a generally vertical direction.

Further according to the invention, there is provided electrochemical conversion apparatus comprising, in combination: an electrolytic cell; a body of electrolyte disposed in said cell; an electrode disposed in said electrolyte, said electrode having a passageway extending therethrough in a generally vertical direction; and means in communication with said passageway for introducing an inert gas into said passageway.

According to the invention now being claimed in said copending application, there is provided in a process for the electrochemical conversion of a feedstock at an electrode disposed in an electrolyte in an electrolytic cell, wherein said feedstock is subjected to contact with said electrode and at least partially converted, and wherein said electrode in service attains a temperature different from the temperature of said electrolyte, the improvement comprising: providing said electrode with at least one passageway extending generally vertically therethrough, said passageway being in communication at at least one end thereof with said electrolyte; and permitting said electrolyte to circulate through said passageway and cool said electrode.

In one preferred embodiment of said process, an inert gas is introduced into the lower end of said passageway so as to increase the circulation of said electrolyte therethrough.

Electrodes are commonly fabricated from a wide variety of materials. The invention is applicable to and can be employed with electrodes made of any material suitable for the process in which the electrode is employed. One of the most advantageous applications of the invention is in electrodes fabricated from materials having a relatively poor heat conductivity. Such materials include ceramics and other porous materials having poor thermal conductivity which can be rendered electrically conductive by impregnation and/or coating with materials such as metallic nickel, platinum, etc., which may or may not be catalytic; and various carbons including, for example, graphite, porous carbon, and nonporous carbon. Said carbons can also be impregnated and/or coated as described, if desired. The carbons are preferred and most often used.

The inert gas employed in the practice of the invention can be any gas which is inert, or essentially inert, with respect to the electrolyte used in the cell, the feedstock, and the products produced in the cell. Examples of suitable inert gases include the commonly known inert gases such as helium, argon, krypton, xenon, nitrogen, etc. Nitrogen, because of its ready availability, is a preferred gas. Frequency, a gas produced in the electrochemical conversion process can be employed as the inert gas. When such gases produced in the process are available, they represent a preferred gas for use in the practice of the invention. For example, in the electrochemical fluorination of fluorinatable organic compounds using an electrolyte comprising hydrogen fluoride, some perhalogenated compounds are produced in the process. Said perhalogenated compounds are inert in the process and can be used in the practice of the invention to enhance circulation of the electrolyte through the passageway(s) provided in the anode. Hydrogen is produced at the cathode in such fluorination processes and can be used in the practice of the invention in some instances such as where the passageways are provided in the dense core of the anode as discussed hereinafter. In such instances where no reaction is occurring in the dense core of the anode the hydrogen can, for practical purposes, be considered essentially inert.

The invention is applicable to electrode when employed as either the anode or the cathode in electrochemical conversion processes wherein heat liberated in the cell is concentrated at the anode and/or the cathode. One process in which the invention is particularly useful is in the electrochemical fluorination processes employing an anode comprising porous carbon and an electrolyte comprising essentially anhydrous liquid hydrogen fluoride. Thus, for purposes of illustration, and not by way of limitation, the invention, in some instances, will be further described herein with particular reference to an electrochemical fluorination process employing an anode comprising porous carbon. Further details of a presently preferred electrochemical conversion process in which the electrodes of the invention can be employed as anodes can be found in copending application Ser. No. 683,089, filed Nov. 2, 1967, by H. M. Fox and F. N. Ruehlen, now Pat. 3,511,760. See also U.S. Pats. 3,461,049 and 3,461,050, issued Aug. 12, 1969, to W. V. Childs.

FIG. 1 is a plan view of an electrode structure in accordance with the invention.

FIG. 2 is a view diagrammatically illustrating the electrode of FIG. 1 (in cross section along the line 2—2 of FIG. 1) employed in an electrolytic cell in accordance with the invention.

FIG. 3 is a plan view of another electrode structure in accordance with the invention.

FIG. 4 is a view diagrammatically illustrating the electrode of FIG. 3 (in cross section along the line 4—4 of FIG. 3) employed in a cathode chamber of an electrolytic cell.

Figure 5:
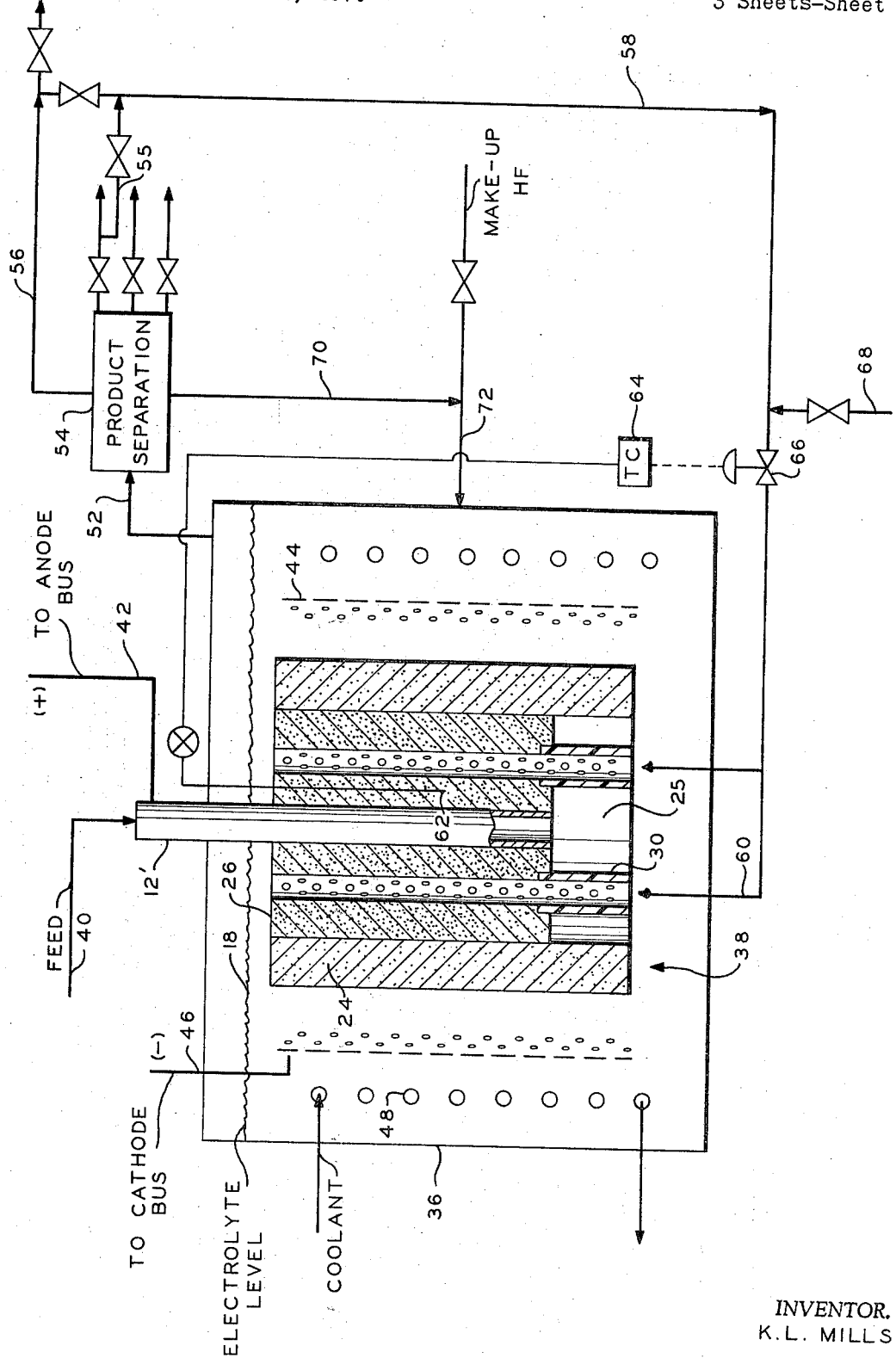
FIG. 5 is a diagrammatic illustration, partly in cross section, illustrating another electrode of the invention, said electrode being employed in a combination of apparatus in accordance with the invention.

Referring now to the drawings, wherein like reference numerals are employed to denote like elements, the invention will be more fully described. In FIG. 1 and FIG. 2 there is illustrated an electrode structure comprising an electrode element 10 having an electrically conductive current collector 12 mounted therein. Electrode element 10 can be made of any suitable material depending upon the process in which it is being used, e.g., graphite, porous carbon, nonporous carbon, etc. At least one passageway 14 extends generally vertically through said electrode element. Preferably, a plurality of said passageways 14 are provided and are uniformly spaced or distributed in the electrode element. As here illustrated, said electrode element 10 is being employed as an anode in an electrolytic cell 16, the case of which is being employed as the cathode. Preferably, the electrolyte level 18 will be about even with or slightly above the top of the electrode element 10.

In the operation of the apparatus illustrated in FIG. 2 the feedstock to be converted can be dissolved in the electrolyte (as in some types of electrochemical fluorination processes) and thus brought into contact with the surface of the anode at which the reaction takes place. In operation, heat will usually be liberated and concentrated at the anode. Means not shown, such as a cooling coil through which a coolant can be circulated, can be disposed in the elcetrolyte for dissipating said heat. In some processes, such as electrochemical fluorination, hydrogen will be liberated at the cathode, similarly as illustrated in FIG. 2. The heat generated in the cell, and usually concentrated at the anode where the principal reaction is occurring, will create a thermal siphon. When the space 15 between the anode and the cathode is relatively large, the gas lift effect of said liberated hydrogen, in the large bulk of electrolyte, will be minimized and the thermal siphon effect will prevail. Thus, in the cell illustrated, electrolyte will flow upwardly through said passageways 14 and downwardly around the electrode element as indicated by the arrows. By providing said passageways 14 and permitting the electrolyte to circulate therethrough, the internal regions of electrode element 10 can be cooled and maintained more nearly at the same temperature as the electrolyte. If desired, circulation of said electrolyte through passageway 14 can be enhanced by the introduction of an inert gas through conduits 20 delivered thereto from conduit 22 which is connected to any suitable source of inert gas. Said inert gas will serve to further lessen the density of the electrolyte in passageway(s) 14 and cause the circulation of the electrolyte to be enhanced.

Referring now to FIGS. 3 and 4, there is illustrated another electrode structure in accordance with the invention. Said electrode structure is a composite structure. Composite electrode structures comprising a porous outer section and a less porous or more dense central section have been found very useful in electrochemical conversion processes. The porous section provides a location for carrying out the conversion or reaction. The less porous or more dense section provides a location for the current collector or connection to the electric current. In one presently preferred embodiment of the invention the electrode is comprised of a porous outer section 24 which comprises a porous carbon, is generally cylindrical in shape, and is hollow. A core section 26 comprising a dense, essentially impervious carbon has the general shape of a generally cylindrical rod and is disposed within said outer section 24. At least one passageway 14 extends generally vertically through said core section 26. A current collector 12 is mounted in said core section 26. Said outer section 24 extends at one end thereof beyond one end of said core section 26. The bottom surface of said core section 26 together with the inner surfaces of said extended portion of said outer section 24 define a cavity 25 in the lower portion of the electrode. Said cavity is provided for the introduction of a feedstock by means of conduit 28 into the pores of said outer section 24. A hollow conduct 30 is secured to the lower end of and extends each of said passageways 14 through said cavity.

As illustrated in FIG. 4, the electrode structure is being employed as an anode and is positioned in a generally cylindrical cathode chamber in an electrolytic cell provided with a plurality of such cathode chambers 32. Said cathode chambers 32 are open at both ends and comprise the tubes in a heat exchange element wherein coolant is circulated on the cell or outer side of the cathode chambers 32. Said cathode chambers are in communication at both ends thereof with a body of electrolyte, the top level of which is indicated at 18. Electrolytic cells constructed in this general manner are illustrated in U.S. Pat. 3,404,083, issued Oct. 1, 1968, in the name of M. S. Kircher. Such cells are usually provided with a plurality of empty chambers 32 which do not contain an anode and which serve as downcomers for the circulating electrolyte. However, by proper sizing of the annular space 34 relative to the available cross section in the passageway(s) 14 provided in core section 26 of the electrode, the gas lift effect of the hydrogen liberated at the cathode can be caused to prevail over the thermal siphon effect and the electrolyte, instead of circulating upwardly through said passageways 14 as in FIG. 2, can be caused to circulate upwardly through annular space 34 and downwardly through said passageways 14, as shown by the arrows in FIG. 4. Thus, the invention not only provides the advantage of internal cooling of the electrode structure, but can also provide the advantage of conserving cell space and structure by the elimination of special downcomer tubes. The method of operation illustrated in FIG. 4 is one presently preferred method of operating in accordance with the invention. If desired, additional gas can be introduced into annular space 34 (similarly as in FIGS. 2 and 5) to enhance the gas lift effect of the liberated hydrogen.

Referring to FIG. 5, there is illustrated an electrochemical conversion apparatus which comprises, in combination, an electrolytic cell 36 having a body of electrolyte disposed therein. An electrode structure 38, similar to the electrode structure illustrated in FIG. 4, is disposed in said electrolyte. The current colector 12' comprises a hollow conduit through which a feedstock to be converted can be introduced via conduit 40 into the cavity 25 in the lower portion of the electrode. If desired, the current collector 12' can be a solid rod-like current collector as in FIGS. 2 and 4. In this instance, the feedstock to be converted would be introduced into the cavity 25 in a manner similar to that illustrated in FIG. 4. A suitable lead wire 42 is connected to current collector 12' in any suitable manner and serves to connect the anode to the anode bus of the current supply. A circular cathode 44, which can be a screen formed of a suitable metal such as stainless steel depending upon the nature of the electrolyte, surrounds said anode and is connected to the cathode bus of the current supply by a suitable lead wire 46. A cooling coil 48, having coolant inlet and outlet conduits connected thereto as illustrated, is provided for removing heat from the electrolyte and thus dissipating the heat generated in the process.

In the operation of the cell arrangement of FIG. 5, a feedstock is introduced into cavity 25 via conduit current collector 12', enters the pores of porous carbon section 24 from said cavity 25, travels upward through the pores of said porous carbon, and exits from the upper end thereof and passes into the space within the cell above electrolyte level 18. During passage through said anode at least a portion of the feedstock is electrochemically converted. Conversion products, together with remaining unconverted feedstock, and possibly some electrolyte vapors, are withdrawn via conduit 52 from the space above the electrolyte within cell 36 and passed to product separation means 54. Said product separation means can comprise any suitable means for effecting a separation of the materials in the cell effluent stream.

In a process for the electrochemical fluorination of a fluorinatable organic compound using an essentially anhydrous liquid hydrogen fluoride electrolyte, hydrogen will be produced at the cathode. Said hydrogen can be withdrawn from separation means 54 via conduit 56 and at least a portion thereof passed via conduit 58 for introduction via conduits 60 into the bottom of passageways 14 to enhance the circulation of electrolyte through said passageway 14. Perhalogenated products of the process can be withdrawn via conduit 55 and used to enhance said electrolyte circulation. If desired, the amount of said hydrogen, or other inert gas introduced via conduit 60, can be controlled in accordance with the temperature of electrode element 38. A temperature sensing means 62 is disposed in said electrode structure for measuring the temperature within the electrode. Said temperature sensing means is operatively connected in known manner to temperature controller 64 which, in turn, is operatively connected to flow control valve 66 disposed in conduit 58. If desired, a suitable inert gas from any suitable source can be introduced via conduit 68 instead of using hydrogen or other inert gas from conduit 56. Any HF electrolyte recovered in product separation means 54 can be returned to the cell via conduits 70 and 72. Make-up electrolyte can be supplied as needed.

Figure 6:
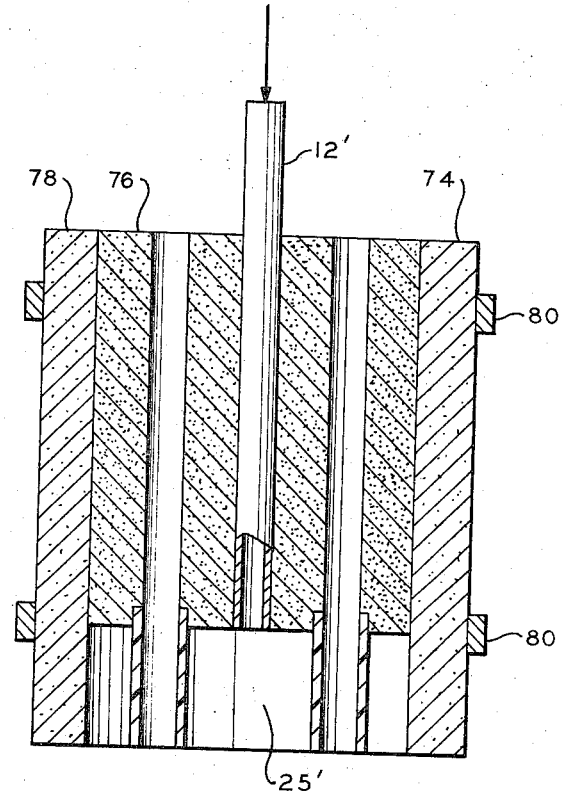
FIG. 6 is a diagrammatic illustration, partly in cross section along the line 6—6 of FIG. 6a, of another electrode structure in accordance with the invention.
Figure 6A:
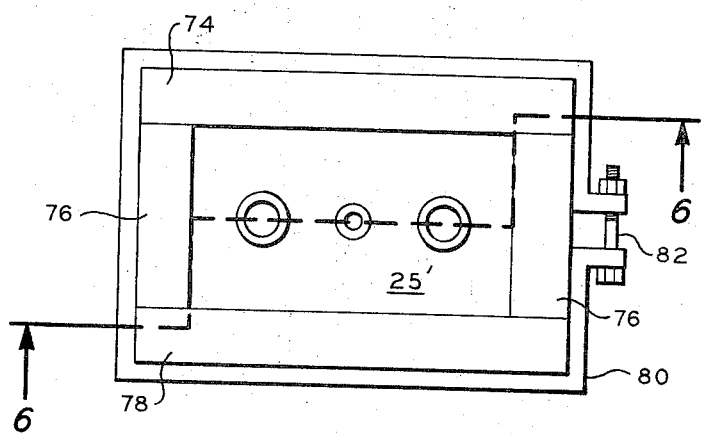
FIG. 6a is a bottom view of the electrode structure of FIG. 6.

The electrode structure illustrated in FIG. 6 is generally rectangular in shape. Said electrode comprises a first rectangular-shaped outer section 74, a core section 76, and a second rectangular-shaped outer section 78. A hollow conduit current collector 12' is mounted in said core section, similarly as in FIG. 5, by a friction fit. Said first outer section 74 and said second outer section 78 extend below said core section 76 on the sides of the electrode as indicated in FIG. 6. Said core section 76 extends downwardly at the ends of the electrode to the same level as the ends of said first and second outer sections, as shown in FIG. 6a to form cavity 25'. A pair of clamp means 80 comprising a band of metal and a bolt 82 are provided for securing said electrode sections together. Said FIG. 6a is a bottom view of the electrode of FIG. 6, and shows the cavity 25' formed in the bottom of the electrode. A reactive feedstock can be introduced into said cavity for introduction into the pores of the first and second outer sections similarly as in FIG. 5.

In the sections of the composite electrodes of the invention which comprise porous carbon, the average pore diameter can be generally in the range of 1 to 150 microns, preferably between 40 and 140, and still more preferably between 50 and 120, microns. These values depend somewhat on the depth of immersion of the electrode, with deeper immersions requiring somewhat smaller pores within the above ranges. Generally, the premeability of such porous carbons will be in the range of 0.5 to 75 darcys. In general, the total porosity can be in the range of about 15 to about 60 percent. The less porous or more dense core or central sections of the electrodes of the invention can have a pore size within the range of about 0.01 to 35, preferably 0.1 to 10, microns average diameter with no significant amount of pores having a diameter exceeding 70 microns.

In the electrodes of the invention the passageway(s) 14 extending therethrough have been illustrated as extending in a vertical direction. This, in most instances, is preferred. However, it is within the scope of the invention for said passageways to extend in directions other than strictly vertical so long as the general direction is upward or generally vertical so as to utilize the thermal siphon and/or gas lift effect. For example, any of the electrodes illustrated in FIGS. 2, 4, 5, and 6 could be provided with spiral passageways. As another example, the passageways 14 in FIGS. 4, 5, and 6 could pass through the outer sections of the electrode in a slanting direction to enter the core section and then either spiral upward or extend generally vertically upward. Said passageways in passing through the outer sections of the electrode would be sealed therefrom.

A number of advantages are realized in the practice of the invention. The passageways 14 make it possible to control the temperature of the electrode to be more nearly the same as the temperature of the electrolyte. Generally, this will involve cooling of the electrode. However, it is within the scope of the invention to increase the temperature of the electrode by circulating a warmer electrolyte therethrough. The protection of the electrodes from excessive variations in temperature will extend the life of the electrode, and will also make it possible to control and/or preserve the selectivity and efficiency of the reactions being carried out at the electrodes. In situations where the reaction occurring at the electrode is temperature dependent, the more uniform electrode temperatures made possible by the invention will reduce the formation of undesirable by-products. Also, as discussed in connection with FIG. 4, the electrodes of the invention make possible more efficient cell construction.

While the electrodes of the invention have been illustrated as anodes, and in some instances have been described with particular reference to electrochemical fluorination processes, the invention is not so limited. The electrodes of the invention can be employed as either anodes or cathodes in any convenient cell configuration or electrode arrangement. The electrodes of the invention can be employed in a wide variety of electrochemical conversion processes. Some examples of such processes are electrochemical halogenation, electrochemical cyanation, and cathodic conversion such as the reduction of alcohols to hydrocarbons or the reduction of acids to alcohols.

The following calculated example will serve to further illustrate the invention.

EXAMPLE

An electrochemical fluorination cell comprising four 5.5 inch I.D. cathode chambers 32, such as illustrated in FIG. 4, is employed in this illustrative embodiment. Each of said cathode chambers has a 4 inch O.D. anode disposed therein, similarly as illustrated in FIG. 4. Said four cathode chambers are uniformly spaced around a centrally disposed empty downcomer tube having a 5.5 inch I.D. Four small downcomer tubes are also provided and are uniformly disposed among said cathode chambers. The cell contains an essentially anhydrous $KF \cdot 2HF$ electrolyte. In operation 250 amperes current is applied to each anode.

In Run 1, wherein the anodes are not provided with passageways 14 extending therethrough, circulation of electrolyte is upward through annular space 34 and then downward through said downcomers. Said circulation is caused primarily by the gas lift effect created by the hydrogen liberated along the wall surface of cathode chamber 32. In this operation in accordance with the prior art, and at an electrolyte temperature of 100° C., the temperature of the interior of the anodes in the top portion and bottom portion is about 110° C., and in the middle portion is about 140 to 150° C.

In Run 2, each of the anodes disposed in cathode chambers 32 is provided with eleven uniformly spaced 0.25 inch diameter passageways 14 extending vertically through the core section 26 of the anode. Said large downcomer tube and said four downcomer tubes are plugged to prevent circulation therethrough. Thus, in this run circulation of the electrolyte is upward through annular space 34 and then downward through said passageways in the anodes. In this operation in accordance with the invention, at an electrolyte temperature of 100° C., and all other conditions essentially the same as in Run 1, the temperature of the interior of the anodes in the top portion and bottom portion is about 110° C., but in the middle portion is only about 120° to 130° C.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. An electrode, suitable for carrying out electrochemical reactions in an electrolysis cell adapted to contain a level of electrolyte therein, comprising:
    an electrode element comprising a generally solid section of electrically conductive material;
    an electrically conductive current collector mounted in said electrode element; and
    at least one passageway means formed in and extending through said electrode element in a generally vertical direction for permitting electrolyte to enter said electrode element from said cell, circulate therethrough, and exit from said electrode element to said cell.

2. An electrode structure according to claim 1 wherein said electrode element comprises porous carbon, a downwardly open cavity is formed in the lower portion of said electrode element, and a hollow conduit means is secured to the lower end of and extends said passageway through said cavity.

3. An electrode structure according to claim 1 wherein: said electrode element comprises an inner essentially impervious core section and an outer porous section secured to said inner core section; said current collector is mounted in said core section; and said passageway extends through said core section.

4. An electrode structure according to claim 3 wherein: said outer section comprises a porous carbon and is generally rectangular in shape; said core section comprises a dense essentially impervious carbon and is generally rectangular in shape; said outer section is disposed on one side of said core section; a generally rectangular second outer section comprising a porous carbon is disposed on the side of said core section which is opposite said first-mentioned outer section; and a fastening means is provided for securing said core section and said outer sections together.

5. An electrode structure according to claim 3 wherein: said outer section comprises a porous carbon, is generally cylindrical in shape, and is hollow; and said core section comprises a dense essentially impervious carbon, has the general shape of a generally cylindrical rod, and is disposed within said outer section.

6. An electrode structure according to claim 5 wherein: said outer section extends at one end thereof beyond one end of said core section; the bottom surface of said core section together with the inner surface of said extended portion of said outer section define a cavity in the lower portion of the electrode; and a hollow conduit means is secured to the lower end of and extends said passageway through said cavity.

7. An electrode structure according to claim 4 wherein said current collector comprises a hollow conduit and extends through said core section into communication with said cavity.

8. Electrochemical conversion apparatus comprising, in combination:
    an electrolytic cell for containing a level of electrolyte;
    an electrode structure in accordance with claim 5 adapted to be disposed in said electrolyte; and
    means for introducing an inert gas into said hollow conduit means.

9. Electrochemical conversion apparatus in accordance with claim 8, comprising in further combination:
    a product separation means for separating hydrogen or other inert gas from a product effluent stream from said cell;
    a product effluent conduit connected to said cell and to said product separation means; and
    a second conduit means connected to said separation means and in communication with said hollow conduit means for introducing at least a portion of said hydrogen or other inert gas into said passageway.

10. Electrochemical conversion apparatus in accordance with claim 9, comprising in further combination:
    a temperature sensing means disposed in said electrode structure for measuring the temperature within said electrode;
    flow control means disposed in said second conduit means; and
    temperature controller means operatively connected to said temperature sensing means and said flow control means for adjusting said flow control means and controlling the flow of said hydrogen or other inert gas to said hollow conduit means and said passageway responsive to said temperature measurement.

11. Electrochemical conversion apparatus comprising, in combination: an electrolytic cell for containing a body of electrolyte; an electrode structure in accordance with claim 1 adapted to be disposed in said electrolyte; and means for introducing an inert gas into said passageway which extends through said electrode structure.

12. Electrochemical conversion apparatus in accordance with claim 11, comprising in further combination: a product separation means for separating hydrogen or other inert gas from a product effluent stream from said cell; a product effluent conduit connected to said cell and to said product separation means; and a conduit means connected to said separation means and in communication with said passageway for introducing at least a portion of said hydrogen or other inert gas into said passageway.

13. Electrochemical conversion apparatus in accordance with claim 12 comprising in further combination: a temperature sensing means disposed in said electrode structure for measuring the temperature within said electrode; flow control means disposed in said conduit means; and temperature controller means operatively connected to said temperature sensing means and said flow control means for adjusting said flow control means and controlling the flow of said hydrogen or other inert gas to said passageway responsive to said temperature measurement.

References Cited
UNITED STATES PATENTS

| | | | |
|---|---|---|---|
| 3,655,535 | 4/1972 | Ruehlen et al. | 204—294 |
| 3,076,754 | 2/1963 | Evans | 204—274 |
| 2,706,175 | 4/1955 | Licharz | 204—274 |
| 1,365,032 | 1/1921 | Greenwalt | 204—277 |
| 1,249,787 | 12/1917 | Leuchter | 204—277 |

JOHN H. MACK, Primary Examiner
W. I. SOLOMON, Assistant Examiner

U.S. Cl. X.R.
204—246, 274, 284, 294

UNITED STATES PATENT OFFICE
CERTIFICATE OF CORRECTION

Patent No. 3,772,201  Dated November 13, 1973

Inventor(s) King L. Mills

It is certified that error appears in the above-identified patent and that said Letters Patent are hereby corrected as shown below:

Column 8, claim 7, line 36, "claim 4" should read -- claim 6 --.

Signed and sealed this 9th day of April 1974.

(SEAL)
Attest:

EDWARD M. FLETCHER, JR.
Attesting Officer

C. MARSHALL DANN
Commissioner of Patents